(12) United States Patent
Choudhury et al.

(10) Patent No.: US 9,324,133 B2
(45) Date of Patent: Apr. 26, 2016

(54) IMAGE CONTENT ENHANCEMENT USING A DICTIONARY TECHNIQUE

(75) Inventors: Anustup Kumar Choudhury, Los Angeles, CA (US); Christopher Andrew Segall, Camas, WA (US); Petrus J. L. Van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 393 days.

(21) Appl. No.: 13/343,441

(22) Filed: Jan. 4, 2012

(65) Prior Publication Data

US 2013/0170767 A1 Jul. 4, 2013

(51) Int. Cl.
*G06T 3/40* (2006.01)

(52) U.S. Cl.
CPC .................................. *G06T 3/4053* (2013.01)

(58) Field of Classification Search
None
See application file for complete search history.

(56) References Cited

U.S. PATENT DOCUMENTS

| | | | |
|---|---|---|---|
| 5,526,446 A * | 6/1996 | Adelson et al. | 382/275 |
| 7,107,048 B2 * | 9/2006 | Chandler | 455/423 |
| 7,336,848 B2 | 2/2008 | Sartor et al. | |
| 7,466,846 B2 * | 12/2008 | David et al. | 382/115 |
| 7,840,089 B2 | 11/2010 | Ho | |
| 7,847,863 B2 | 12/2010 | Ali | |
| 7,912,323 B2 | 3/2011 | Okuno et al. | |
| 7,957,605 B2 | 6/2011 | Ali | |
| 7,969,510 B2 | 6/2011 | Weston et al. | |
| 8,396,310 B1 * | 3/2013 | Kadambe et al. | 382/239 |
| 8,582,916 B2 * | 11/2013 | Bar-Aviv et al. | 382/275 |
| 9,153,036 B2 * | 10/2015 | Bosco et al. | |
| 9,159,119 B2 * | 10/2015 | Shechtman et al. | |
| 2005/0100237 A1 * | 5/2005 | Kong et al. | 382/261 |
| 2005/0243099 A1 * | 11/2005 | Dumitras et al. | 345/582 |
| 2006/0034512 A1 | 2/2006 | Sheraizin et al. | |
| 2006/0188168 A1 | 8/2006 | Sheraizin et al. | |
| 2007/0223834 A1 | 9/2007 | Lertrattanapanich et al. | |
| 2009/0010333 A1 * | 1/2009 | Tourapis et al. | 375/240.15 |
| 2009/0220169 A1 | 9/2009 | Bennett et al. | |
| 2010/0027905 A1 | 2/2010 | Zhang et al. | |
| 2010/0033602 A1 * | 2/2010 | Okada et al. | 348/241 |
| 2011/0091129 A1 * | 4/2011 | Ichihashi et al. | 382/275 |
| 2011/0115934 A1 * | 5/2011 | Wang | 348/222.1 |
| 2011/0115951 A1 | 5/2011 | Hong | |

FOREIGN PATENT DOCUMENTS

| | | |
|---|---|---|
| EP | 2290946 A2 | 3/2011 |
| EP | 1610267 B1 | 6/2011 |
| WO | 2011011542 A1 | 1/2011 |

OTHER PUBLICATIONS

Xie, J., Zhang, L., You, J., & Zhang, D. (Sep. 2010). Texture classification via patch-based sparse texton learning. In ICIP (pp. 2737-2740).*

(Continued)

*Primary Examiner* — Michelle Entezari
(74) *Attorney, Agent, or Firm* — Chernoff Vilhauer McClung & Stenzel, LLP (57) ABSTRACT

A system for determining a high resolution image includes receiving a low resolution image and determining a vector of a patch of the low resolution image based upon a low resolution dictionary. The system includes determining a high resolution patch based upon a high resolution dictionary and the vector and determining the high resolution image based upon the high resolution patch.

22 Claims, 9 Drawing Sheets

(56) References Cited

OTHER PUBLICATIONS

Malioutov, D. M., Cetin, M., & Willsky, A. S. (Mar. 2005). Homotopy continuation for sparse signal representation. In Acoustics, Speech, and Signal Processing, 2005. Proceedings.(ICASSP'05). IEEE International Conference on(vol. 5, pp. v-733). IEEE.*

Quattoni, A., Collins, M., & Darrell, T. (Jun. 2008). Transfer learning for image classification with sparse prototype representations. In Computer Vision and Pattern Recognition, 2008. CVPR 2008. IEEE Conference on (pp. 1-8). IEEE.*

Dong, W. Zhang, D., & Shi, G. (Nov. 2011). Centralized sparse representation for image restoration. In Computer Vision (ICCV), 2011 IEEE International Conference on (pp. 1259-1266). IEEE.*

Zeyde et al., "On Single Image Scale-Up Using Sparse-Representations," In Curves and Surfaces, SIAM LNCS, 2010, 20 pgs.

Zhang et al., "Adaptive Bilateral Filter for Sharpness Enhancement and Noise Removal," IEEE Trans. Image Processing, vol. 17, No. 5, May 2008, pp. 664-678.

Elad et al., "Image Denoising Via Sparse and Redundant Representations Over Learned Dictionaries," IEEE Trans. Image Processing, vol. 15, No. 12, Dec. 2006, pp. 3736-3745.

Lee et al., "Efficient sparse coding algorithms," NIPS, 2007, 8 pgs.

Fattal, "Multiscale Shape and Detail Enhancement from Multi-light Image Collections," ACM SIGGRAPH 2007, 9 pgs.

Farbman et al., "Edge-preserving decompositions for multi-scale tone and detail manipulation," ACM SIGGRAPH 2008, 10 pgs.

Yang et al., Images Super-Resolution as Sparse Representation of Raw Image Patches, IEEE Int. Conf. on Computer Vision and Pattern Recognition (CVPR), 2008, 8 pgs.

Yang et al., "Image Super-Resolution via Sparse Representation," IEEE Trans. Image Processing, 19:2861-2873, Nov. 2010, 13 pgs.

* cited by examiner

IMAGE CONTENT ENHANCEMENT USING A DICTIONARY TECHNIQUE

CROSS-REFERENCE TO RELATED APPLICATIONS

None.

BACKGROUND OF THE INVENTION

The present invention relates to image content enhancement using a dictionary based technique.

Digital images are typically represented as an array of pixels. Similarly, digital video is typically represented as a series of images or frames, each of which contains an array of pixels. Each pixel includes information, such as intensity and/or color information. In many cases, each pixel is represented as a set of three colors, each of which is defined by eight bit color values.

In many cases, image and/or video encoding and/or transmission systems degrade the quality of the image content in order to reduce the storage requirements and/or the bandwidth requirements for transmission. After encoding and/or transmitting an image and/or video, a restoration technique is used on the image and/or video to attempt to recover the high-quality original image content from the degraded version. The degradation of the image content may occur as a result of numerous reasons, such as for example, image transmission, image coding, limitations of capture or display devices, etc. On the other hand, the enhancement of a degraded image attempts to improve the appearance of the image and/or video.

Restoration and enhancement of the image and/or video is often a processing step in an image/video display system, especially in large-sized displays. One of the goals may be to restore and enhance the visual appearance of important components of the image and/or video, for example edges, textures and other detail. Another goal is to limit the introduction of undesirable visual artifacts and/or amplification of existing artifacts during restoration and enhancement. A specific example is to limit the introduction or amplification of existing noise in the image and/or video, such as camera noise or compression noise. Another example is to limit introduction of artifacts near edges and contours known as "halo", "undershoot" and "overshoot".

Many different techniques have been used to attempt to perform image (inclusive of video) detail enhancement in order to restore an image. Many such techniques are based upon a hierarchical framework using a Laplacian pyramid to decompose the image into multiple levels, including a smooth low frequency image and other high frequency components. Each level is then enhanced and combined together to form the enhanced image. While decomposing the image, edge preservation techniques may be used to reduce halo effects.

Another technique to perform image detail enhancement involves applying a bilateral filter to get different components of the image under multiple lighting conditions and enhance the details of the image by combining these components. The range of the bilateral filter may be modified to simultaneously perform both detail enhancement and noise removal. Another technique includes acquiring information about oscillations of the image from local extrema at multiple scales and using this information to build a hierarchy which is used to enhance details of the image. Yet another technique involves using wavelets to build a multi-resolution analysis framework to decompose an image into smooth and its detail components, where the wavelets are specifically constructed according to the edge content of the image to reduce halo effects.

Figure 1:
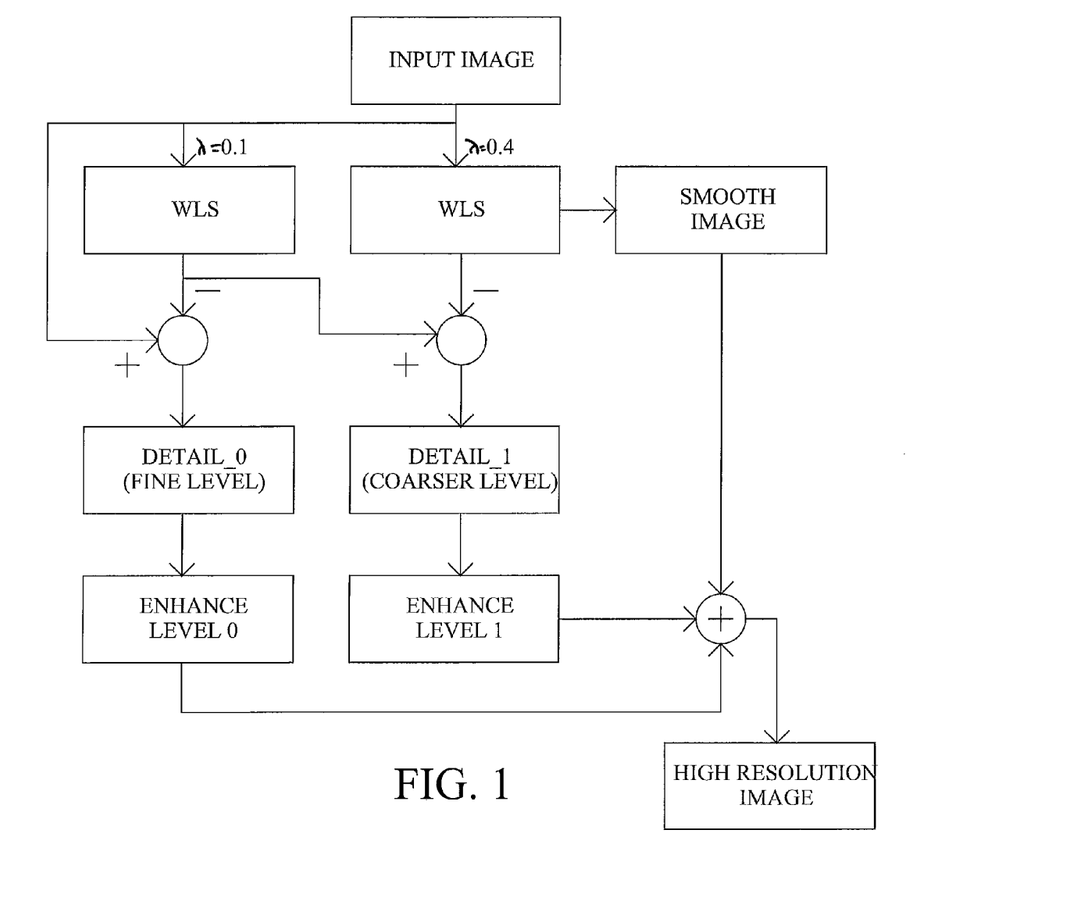
FIG. 1 illustrates a Laplacian pyramid framework for a WLS technique.

Another technique to perform image detail enhancement uses a filter to perform multi-scale decomposition of images. The filter is edge-preserving and the smoothing is based on a Weighted Least Squares (i.e., WLS) optimization framework. This may be mathematically represented as calculating the minimum of, $$\sum_p \left( (u_p - g_p)^2 + \lambda \left( a_{x,p}(g) \left( \frac{\partial u}{\partial x} \right)_p^2 + a_{y,p}(g) \left( \frac{\partial u}{\partial y} \right)_p^2 \right) \right) \quad (1)$$

where g is the input image, u is the output image and subscript p is the spatial location of the pixel. This function tries to maintain u as close as possible to g and achieves smoothness by minimizing the partial derivatives of u. The smoothness weight is determined by $a_x$ and $a_y$, while $\lambda$ controls the amount of smoothing. Greater $\lambda$ implies more smoothing. For example, this technique may be used in a Laplacian pyramid framework to obtain abstraction at different levels, as illustrated in FIG. 1.

Many existing techniques for detail enhancement, such as mentioned above, are effective in enhancing significant edges and contours in the image and/or video. However, very few techniques exist that are effective in enhancing texture detail, while at the same time limiting introduction of undesirable artifacts. Techniques that are effective at enhancing edges as well as texture detail and limit the introduction of undesirable artifacts into the image are of interest.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

One suitable technique to perform image detail restoration and/or image enhancement includes using a dictionary-based technique. Dictionary-based techniques have traditionally been used to perform noise reduction and super-resolution.

The use of a dictionary-based technique for image enhancement may be advantageous, because desirable image characteristics such as fine detail and texture may be obtained from a dictionary containing high-quality image data, without introduction or amplification of noise or other artifacts. In general, the dictionary based techniques often use sparse signal representation where the linear relationships amongst high-resolution patches can be generally recovered from its low-dimensional projections. To increase computational efficiency, a joint compact dictionary may be learned using the correspondence between the high-resolution patches and features extracted from the low-resolution training patches. The term "high-resolution" is used in general to mean high-quality image and/or video data, for example image data containing high-frequency components, and/or image data containing fine details and textures, and/or image data with sharp edges and contours. The term "low-resolution" is used in general to mean image and/or video data that may have been degraded during capture, encoding or transmission, and generally contains fewer high-frequency components, and/or fewer detail and/or compression artifacts.

Assume that the system has a high-resolution overcomplete dictionary $D_h \in R^{n \times K}$ with K atoms (dictionary elements), where each atom is an image patch consisting of n pixels. Consider a high resolution image patch $x \in R^n$ consisting of n pixels. One can represent x as a sparse linear combination of elements (atoms) from the dictionary $D_h$ as follows:

$$x \approx D_h \alpha_0, \text{with} \|\alpha_0\|_0 << n \quad (2)$$

where, $\alpha_0 \in R^K$. In other words, $\alpha_0$ is a vector with K coefficients, where each coefficient weights a corresponding dictionary atom and the number of non-zero coefficients of $\alpha_0$ is small.

However, typically one does not observe this high resolution patch x but instead observes its low resolution version (or features extracted from it), $y \in R^n$. Thus, let this low resolution image patch y be obtained from its high resolution patch using an image degradation operator L. In the case of super-resolution (SR), L may be, for example, a downsampling and a blur operator. Thus, $$y = Lx = LD_h \alpha_0. \quad (3)$$

A low resolution dictionary $D_l$ may be constructed corresponding to the high resolution dictionary $D_h$ using similar low resolution patches and may be represented as $D_l = LD_h$. The low resolution patch may be represented as $y = D_l \alpha_0$. The degradation operator L may be modified, as described later.

In one implementation, the system may use the low resolution input image from which to extract patches y. The system also has the low resolution dictionary $D_l$ and the high resolution dictionary $D_h$. An exemplary training process to obtain the dictionary is described below. For each low resolution input patch y, the system finds a sparse solution $\alpha_0^*$ with respect to $D_l$. These coefficients are combined with $D_h$ to provide the high resolution patch x as illustrated in equation 2. The sparse solution may be determined as follows:

$$\alpha_0^* = \operatorname{argmin} \|\alpha\|_0 \text{ subj. to } y = D_l \alpha. \quad (4)$$

This optimization is NP-hard and therefore the system may perform convex relaxation and instead minimize the $l_1$-norm as follows:

$$\alpha_0^* = \operatorname{argmin} \|\alpha\|_1 \text{ subj. to } y = D_l \alpha. \quad (5)$$

One may, represent equation 5 as follows:

$$\alpha_0^* = \operatorname{argmin} \|\alpha\|_1 \, s.t. \|D_l \alpha - y\|_2^2 \leq \epsilon. \quad (6)$$

Using Lagrange multipliers, equation 6 can be represented as:

$$\alpha^* = \min_\alpha \|D_l \alpha - y\|_2^2 + \lambda \|\alpha\|_1, \quad (7)$$

where, $\lambda$ balances the sparsity of the solution by indicating how many atoms should be considered from the dictionary. For example, a smaller $\lambda$, indicates that the system will attempt to use a fewer number of non-zero weights (coefficients of $\alpha$), while a larger $\lambda$ indicates that the system will attempt to use a larger number of non-zero weights (coefficients of $\alpha$). The first part of equation 7 generally represents a minimization of the square of the L2 norm, while the second part of equation 7 generally represents the L1 norm which is similar in effect to enforcing sparsity.

An exemplary technique may be as follows:

Input: (1) low resolution input image Y, (2) high resolution dictionary $D_h$, and (3) low resolution dictionary $D_l$;

Output: high resolution output image X;

for every 5×5 patch y of image Y starting from the upper-left corner with an overlap of 4 pixels in each direction do;

Determine the sparse vector $\alpha^*$, by solving the optimization problem with $D_l$ an y as shown in equation 9: $\alpha^* \min_\alpha \|FD_l \alpha - Fy\|_2^2 + \lambda \|\alpha\|_1$;

Generate the high resolution patch $x = D_h \alpha^*$ based upon the high resolution dictionary $D_h$ and the sparse vector $\alpha^*$;

Put this patch x at the corresponding location in the image X; end for.

Figure 2:
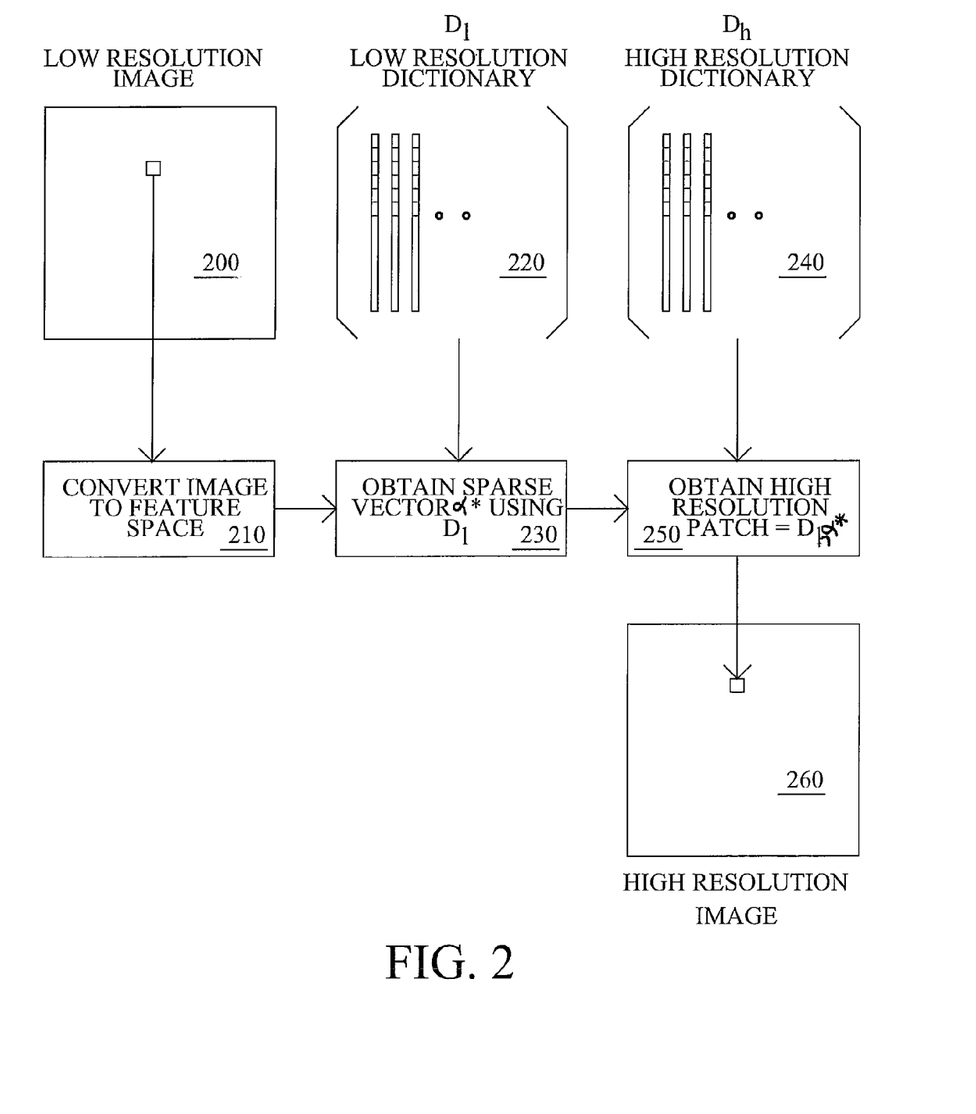
FIG. 2 illustrates a dictionary based framework for image processing.

A framework suitable to implement this exemplary technique is illustrated in FIG. 2. The system samples patches of size 5×5 from the low resolution image 200 starting from the upper-left corner with an overlap of 4 pixels in each direction. Any size and arrangement of patches may be used. Then for every, or selected patches, the system optionally extracts features F 210 (see F in equation 9). By way of example, the system may use the following four 1-D filters to extract the first and second order derivatives (features) from the image:

$$f_1 = [-1, 0, 1];$$

$$f_2 = f_1^T;$$

$$f_3 = [1, 0, -2, 0, 1];$$

$$f_4 = f_3^T; \quad (8)$$

where, the superscript T refers to transpose. The result of using these feature extraction filters is to identify the higher frequencies, fine details and edges of the image thus emphasizing a part of signal that is relevant to human perception. If desired, these filters may not need to be applied directly to the image patches but instead may be applied to the entire image to convert the image to the feature space and then extract patches from that image. The low resolution dictionary $D_l$ 220 may be used together with the features 210 to determine the sparse vector $\alpha^*$ using $D_l$ 230. One may represent the final optimization function as follows:

$$\alpha^* = \min_\alpha \|FD_l \alpha - Fy\|_2^2 + \lambda \|\alpha\|_1. \quad (9)$$

This optimization stage may be implemented using any suitable technique. The same sparse vector $\alpha^*$ (or other sparse vector) used with the low resolution dictionary may be used with the high resolution dictionary $D_h$ 240. The combination of the sparse vector $\alpha^*$ 230 together with the high resolution dictionary 240 may be used to determine the high resolution patch 250 which is used to construct the high resolution image 260. Averaging of overlapping patches in the high resolution image may be used to determine a final output image. It is noted that this technique does not need to enforce a global reconstruction constraint.

The training process to determine the low resolution dictionary 220 and the high resolution dictionary 240 may use any suitable technique. The dictionary training process is typically an off-line process. The system may construct and train the two dictionaries $D_h$ and $D_l$ so that they have the same (or generally the same) sparse representations for each high-resolution and low-resolution image pair. For example, the dictionaries may be based upon sample image patch pairs directly from low-resolution and high-resolution images while preserving the correspondences between the spatial locations. For example, around 100,000 patches may be selected from a database by randomly sampling patches from the images. However, this results in large dictionaries and therefore increases the computational complexity of the system. Therefore, in order to decrease the computational complexity during testing, a more compact dictionary is preferably used. This compact dictionary is preferably determined such that the sparse representation of the high resolution patch is generally the same as the sparse representation of the corresponding low resolution patch.

Figure 3:
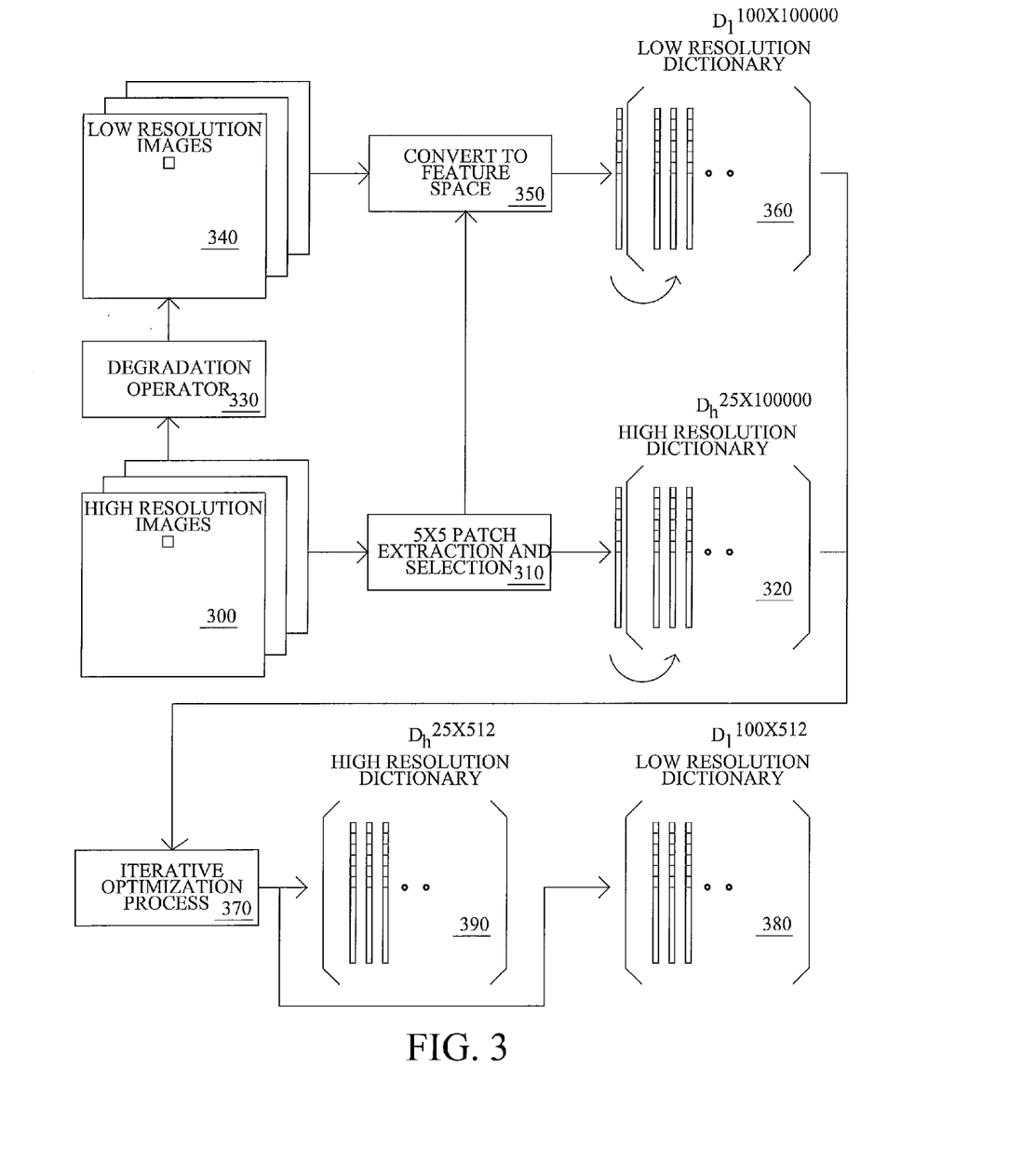
FIG. 3 illustrates a dictionary based training framework for image processing.

An exemplary framework suitable to implement the training technique is illustrated in FIG. 3. The system may randomly sample 5×5 image patch pairs from the high resolution images 300 such that $X^h = \{x_1, x_2, \ldots, x_n\}$ and $Y^h = \{y_1, y_2, \ldots, y_n\}$ form the data set. Then the system performs a selection process to remove smooth patch pairs 310 which are not as useful for image enhancement. For example, this may be done by considering the variance of the high resolution patches. Patch-pairs may be discarded for the high-resolution patches that have variance less than a certain threshold (e.g., 10). This process tends to keep high frequency information in the dictionary learning process. Since the system may consider 5×5 patch sizes and a 100,000 samples, therefore the initial size of the high resolution dictionary may be $D_h^{25 \times 100000}$ 320. For the low resolution dictionary, the system may use a suitable degradation operator 330 to convert the high resolution images 300 to low resolution images 340. The system may then convert the low-resolution images 340 into corresponding feature space 350, as previously described, if desired. For example, if 4 features are being considered and each patch has size 5×5, the size of the low resolution dictionary is $D_l^{100 \times 1000000}$ 360.

The system may perform a joint dictionary training 370 by concatenating the patch-pairs and optimizing the function $$\min_{D_h, D_l, Z} \|X_c - D_c Z\|_2^2 + \lambda \|Z\|_1 \, s.t. \|D_{c_i}\|_2^2 \leq 1, \quad i=1, 2, \ldots, K \tag{10}$$

where K is the number of atoms (which may be 512) and $$X_c = \begin{bmatrix} \frac{\sqrt{25}}{\sqrt{25+100}} X^h \\ \frac{\sqrt{100}}{\sqrt{25+100}} Y^l \end{bmatrix}, \quad D_c = \begin{bmatrix} D_h \\ D_l \end{bmatrix}. \tag{11}$$

The result is a more optimized low resolution dictionary 380 and a more optimized high resolution dictionary 390. This formulation is not convex in both $D_c$ and Z and therefore the optimization may be performed in an iterative manner over Z and $D_c$. The required minimization stages may be implemented using a suitable technique known in the prior art. An exemplary technique may be as follows:

1. Initialize $D_c$ with a Gaussian random matrix;
2. Fix $D_c$ and update Z by $$\arg\min_Z \|X_c - D_c Z\|_2^2 + \lambda \|Z\|_1, \tag{12}$$

3. Fix Z and update $D_c$ by $$D_c = \arg\min_{D_c} \|X_c - D_c Z\|_2^2 \, s.t. \|D_{c_i}\|_2^2 \leq 1, \, i=1, 2, \ldots, K \tag{13}$$

4. Iterate between the previous 2 steps until convergence.

Typically during video transmission and/or video coding, some information is lost and/or some artifacts get introduced, therefore the frames of the video get degraded. To simulate the video transmission and/or coding process, different degradation operators 330 may be used to modify the training image dataset to learn the corresponding degradation model. This is equally applicable for images. Accordingly, the system degrades the high resolution image with the corresponding degradation model to learn the resulting dictionary. The resulting dictionary is used on similar degraded images to reconstruct the images suffering from similar degradation.

One degradation model is a Gaussian blur. The system blurs the images using a Gaussian kernel and edge information tends to be lost during the process. While a generally suitable degradation model, the resulting images from reconstruction tend not to be as good as desired.

Another degradation model includes the introduction of compression artifacts, such as blocking artifacts. The introduction of compression artifacts in the training process tends to be generally similar to artifacts introduced during video encoding. The compression artifacts, which include blocking artifacts, are generally introduced in the uniform regions of the image and along certain edges of the image, resulting in a loss of information. Using such compression artifacts in the dictionary training process results in improved image reconstruction when the input image content (that is to be reconstructed and enhanced) includes such similar compression artifacts.

Yet another degradation model includes texture removal using a filter, such as a bilateral filter. In general, a bilateral filter (or other similar filters) preserves edges of the image while removing texture from the images. Texture removal is a problem resulting from many video coding techniques. The bilateral filter smoothens the image by replacing pixels with a weighted sum of its neighbors and the weights often depend on two principal factors. The first factor is the proximity of the neighboring pixels to the current pixel. The second factor is the similarity of the neighboring pixels to the current pixel. The more similar and the closer pixels are given more weight in the process. The reconstruction and enhancement of input images lacking in texture detail tends to result in improved visual appearance, when using such a degradation operator in the dictionary training process.

While processing images, $\lambda$ determines the number of atoms or dictionary elements that are considered while reconstructing the image (corresponding to non-zero weights or coefficients of $\alpha^*$). A lower $\lambda$ implies more atoms are being considered. As a result of the introduction of compression artifacts, blockiness can be observed in the uniform regions of the image while some information is lost from the textured regions of the image resulting in those regions appearing more smooth. Therefore, to reconstruct an image resulting from the introduction of compression artifacts and other textural removal based artifacts, the system should introduce texture in selected regions as well as reduce blocking artifacts. Introducing texture in a suitable manner generally requires a greater number of atoms to be considered than the number of atoms suitable for the reduction of blocking artifacts. As a result, the system should modify λ of the image according to the localized texture content of the image.

To estimate localized texture content of the image the system may, for example, use the standard deviation of a small patch. In general, the textured regions tend to have a higher standard deviation than uniform regions of the image.

To reconstruct images suffering from compression artifacts using the dictionary-based technique, the system may vary λ in any suitable manner adapting to the local image content. One example of such an adaptation of λ for each image patch that is processed is illustrated as follows:

```
if the standard deviation of the patch is < 10 then;
    λ = 0.5;
else if standard deviation of the patch is in the range of [10,15] then;
    λ = 0.1;
else;
    λ = 0.01
end if.
```

Thus for low standard deviations (smooth regions), the λ is selected to be relatively high (λ=0.5). Thus for high standard deviations (texture regions), the λ is selected to be relatively low (λ=0.01). Thus for intermediate standard deviations, the λ is selected to be at an intermediate level. Other selection techniques may likewise be used.

As previously described, in order to learn the dictionary or to reconstruct from a low-resolution image, the system may extract features from the low-resolution images and extract patches from those images in a feature space. Such features tend to provide an improved representation of the low-resolution image and thus tend to improve the resulting high frequency reconstruction of the image. It is advantageous to weight desirable image features more strongly by modifying the feature extraction process or selecting appropriate feature extraction techniques. For example, to reconstruct and enhance fine detail and texture, it is advantageous to utilize feature extraction techniques that emphasize such fine detail and texture features more strongly.

An exemplary feature filter that tends to focus on the texture aspects of the image content includes the following:

$f_1 = [-1, 0, 1]$;

$f_2 = f_1^T$;

$f_3 = [1, -2, 1]$;

$f_4 = f_3^T$.

Another exemplary feature filter that tends to focus on the texture aspect of the image content includes using a Gabor filter. The Gabor filter is a linear filter used for edge detection and in texture retrieval. The impulse response of the Gabor filter is the product of a harmonic function and a Gaussian function.

Another exemplary feature filter that tends to focus on the texture aspect of the image content includes using a steerable complex pyramid. The steerable complex pyramid is a linear filter and may be used at multiple scales and multiple orientations to perform decomposition of the image to extract features. For example, this filter may be used at a single scale with 4 different orientations to extract image features.

Another exemplary feature filter that tends to focus on the texture aspect of the image content includes using a Sobel filter, such as for example, $f_1 = [-1, 0, 1; -2, 0, 2; -1, 0, 1]$;

$f_2 = f_1^T$;

$f_3 = [1, -2, 1]$;

$f_4 = f_3^T$.

Another exemplary feature filter that tends to focus on the texture aspect of the image content includes using a Laplacian high pass filter.

Another exemplary feature filter that tends to focus on the texture aspect of the image content includes using a 45 degree and a 135 degree filter. For example, the filter may include, $f_1 = [-1, 0, 1]$;

$f_2 = f_1^T$;

$f_3 = [1, -2, 1]$;

$f_4 = f_3^T = [-1, 0, 1]$;

$f_5 = [1, 1, -2; 1, -2, 1; -2, 1, 1]$;

$f_6 = [-2, 1, 1; 1, -2, 1; 1, 1, -2]$.

In some embodiments, the dictionaries may be trained without extracting the features. Moreover, the patch size and/or the number of atoms of the dictionary may be modified, as desired. In some embodiments, multiple dictionaries may be used. In some embodiments, the system may select among multiple dictionaries.

Figure 4:
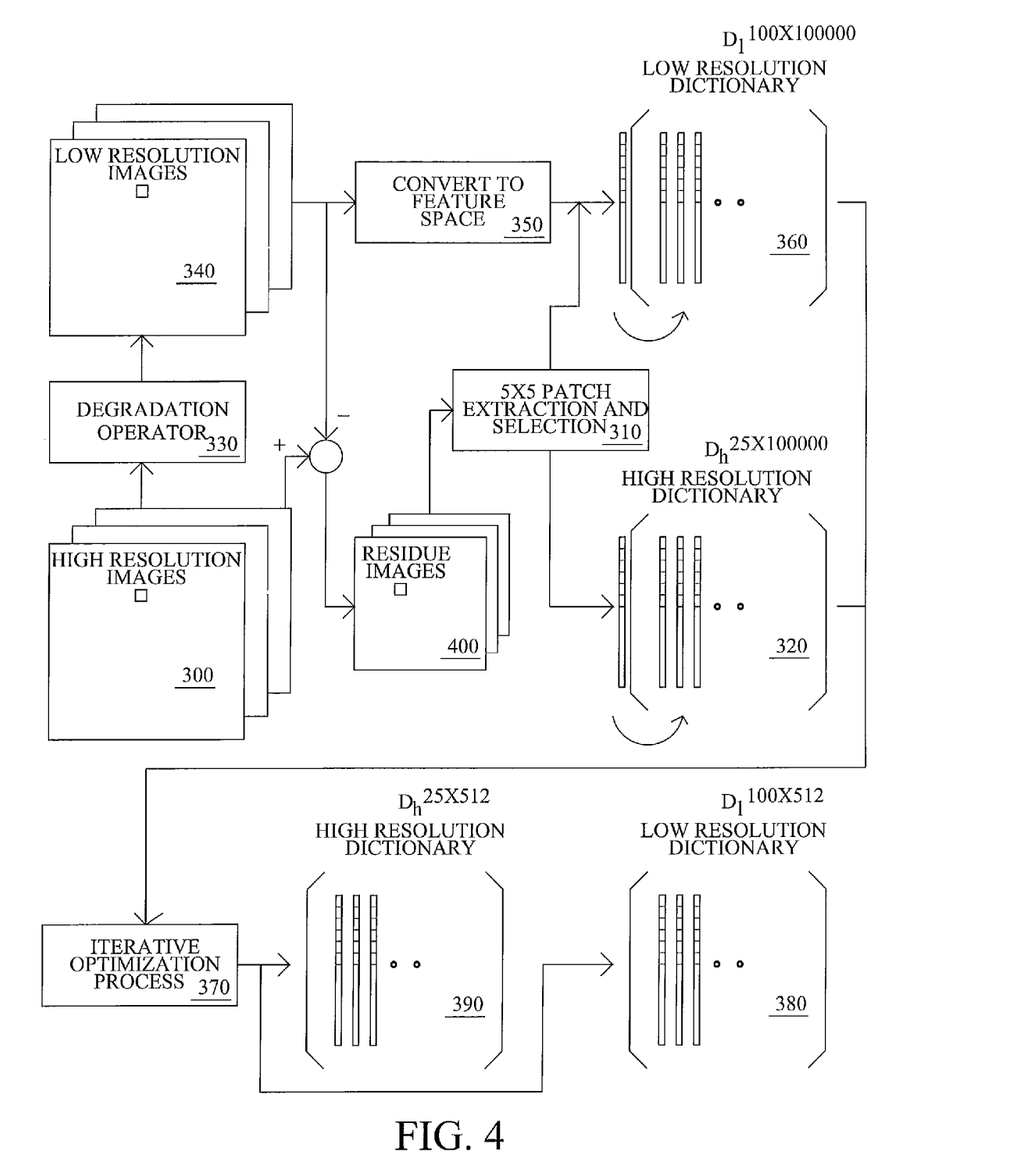
FIG. 4 illustrates a modified dictionary based training framework for image processing.
Figure 5:
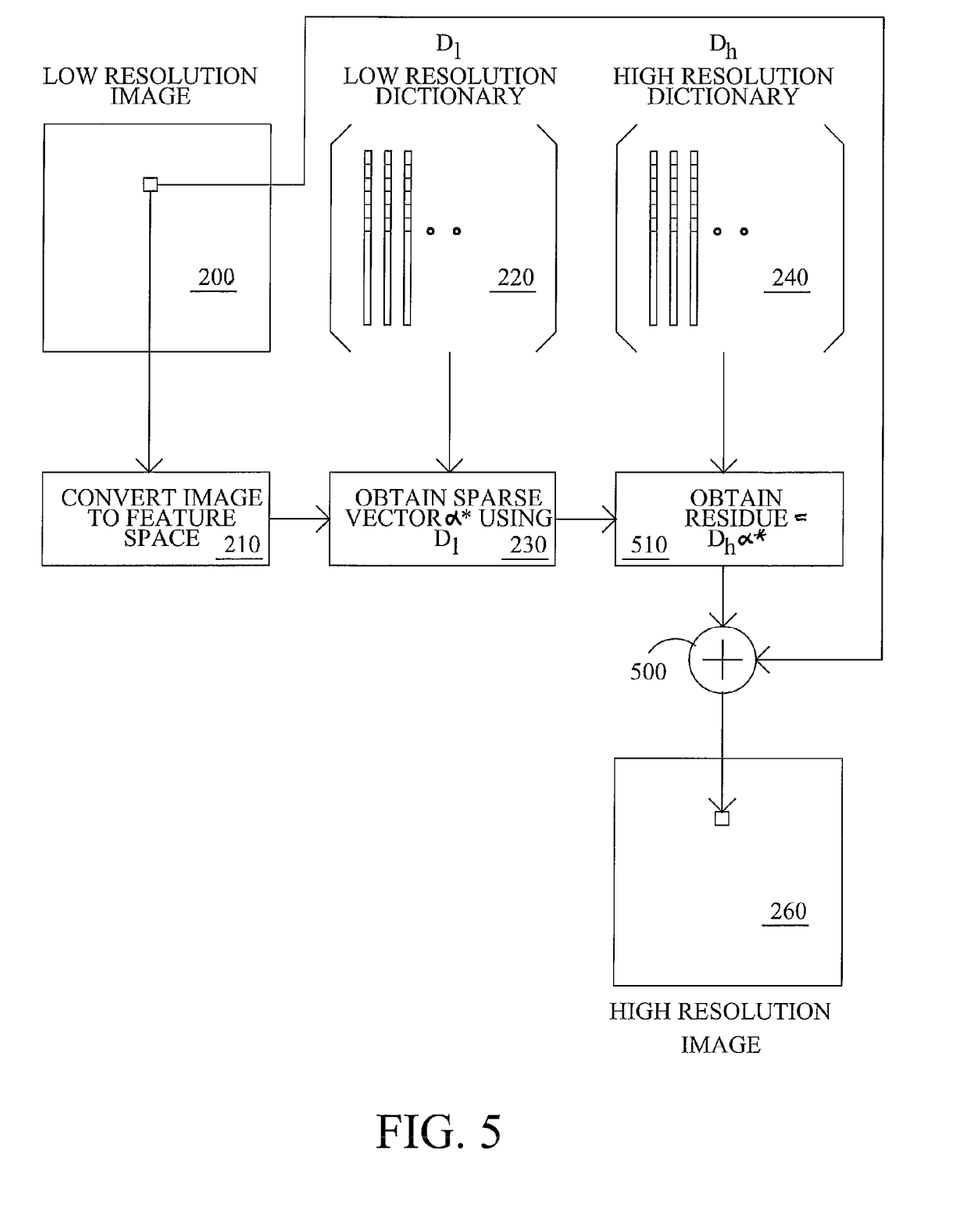
FIG. 5 illustrates a modified a dictionary based framework for image processing.

Referring to FIG. 4, in some implementations, instead of using the high-resolution patch by itself to determine the dictionaries (as illustrated in FIG. 3), the system may make use of a residue (difference) 400 between the high-resolution patch and the low-resolution patch while training the dictionary. By using the residue 400, the low resolution image content is omitted or otherwise reduced in the processing. Referring to FIG. 5, with the dictionaries being determined based upon the residue 400, the low resolution image content is added 500 back to the residue 510 determined based upon the high resolution dictionary 240 to provide the high resolution image patch 260.

As previously discussed the dictionaries are determined based upon a large database of training images that are different from the set of images to be processed. However, in some cases the dictionary is not available or is otherwise not sufficient for the particular image content. In such a case, the system may train the dictionary in an on-line manner using the current input image content. This may be performed by assuming a degradation model. The system assumes it has a high-resolution image which actually may be a degraded input image. The system then degrades the "high-resolution" image using a suitable technique. The system considers this degraded image to the low-resolution image and learns the dictionary based upon patches of the features of this newly determined low-resolution image and the original higher-resolution image. Using the newly trained dictionary (or parts thereof) the system enhances the input image. Thus the system may be extended to perform "bootstrapping" from one or more images (with or without a previous dictionary).

Figure 6:
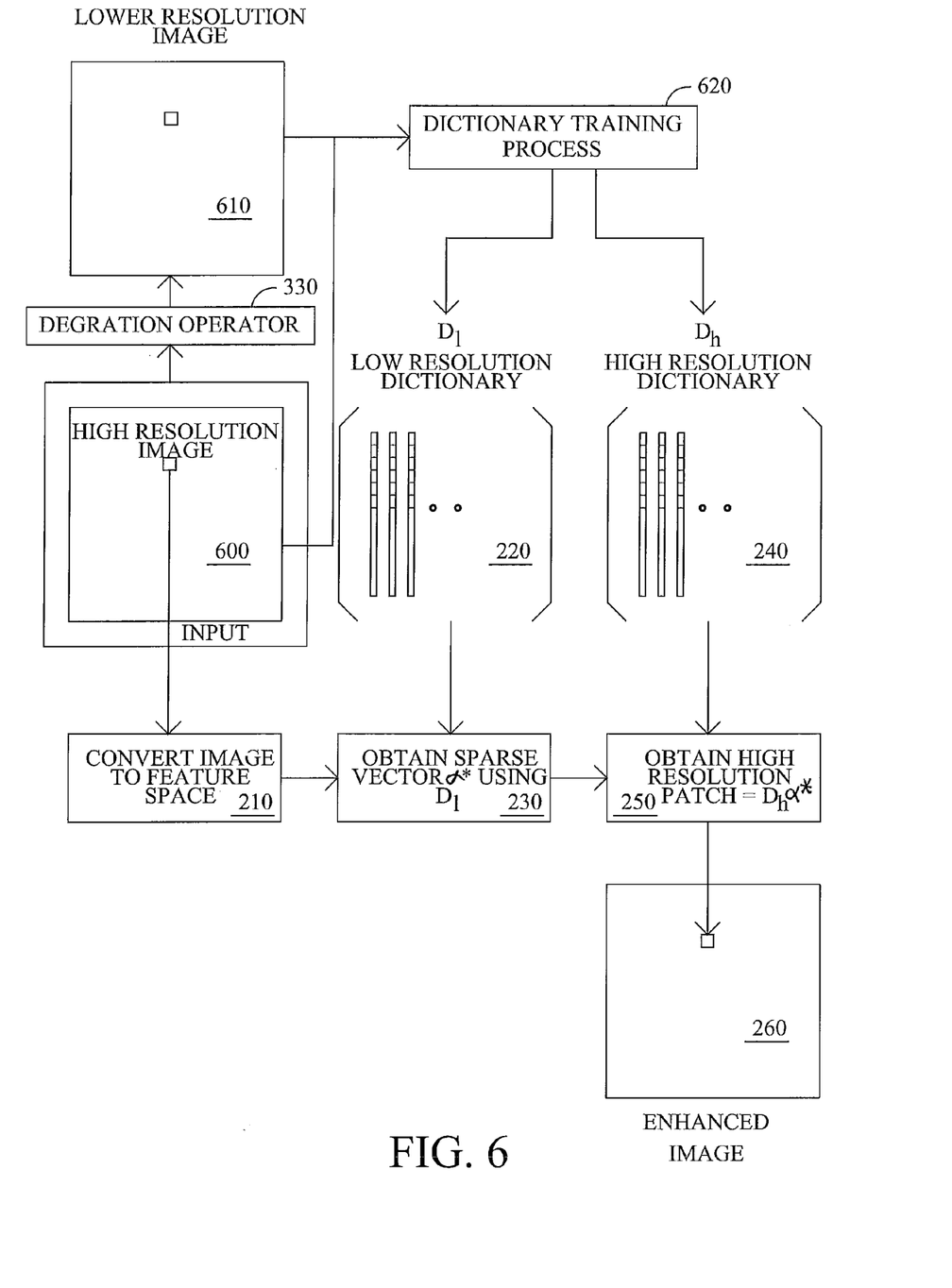
FIG. 6 illustrates a modified dictionary based framework for image processing.

Referring to FIG. 6, an exemplary technique for bootstrapping is illustrated. The dictionary training process 620 includes patch extraction and selection from one or more input images 600, 610 instead of, or in addition to, a database of images. The dictionary training process 620 applies features to the low-resolution images 610, and applies the iterative optimization process to construct and/or update the low and high resolution dictionaries 220, 240.

While the described processes may be used for restoration to recreate the original image, the techniques may be extended to enhance the images to a state "better" than the original image. In such a case, the created image is more visually pleasing than the original image.

Figure 7:
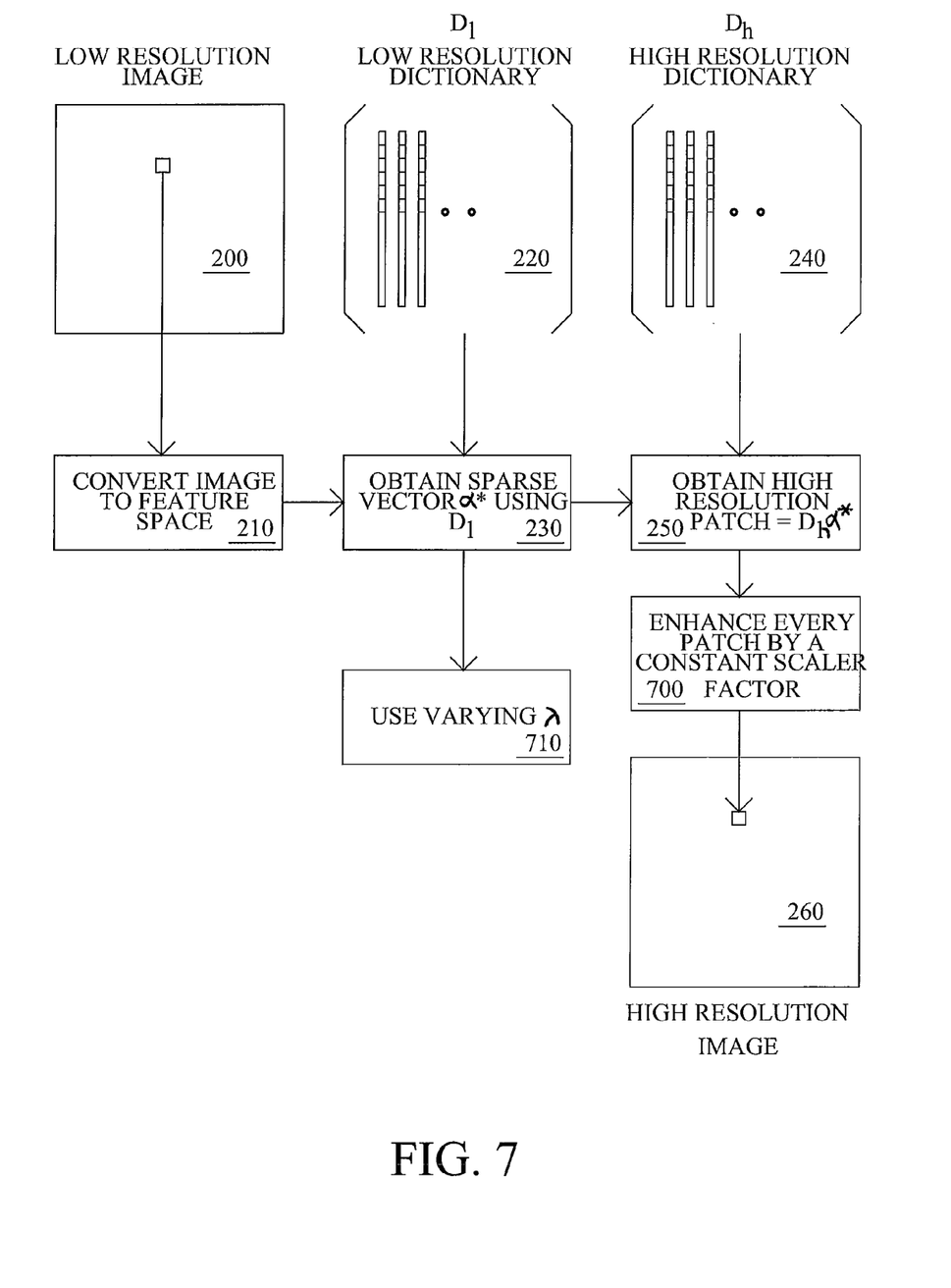
FIG. 7 illustrates a modified dictionary based framework for image processing.

Referring to FIG. 7, a suitable modification to increase the effectiveness of the dictionary based technique is to increase the intensity of high-resolution patches by a constant scalar factor (or any other suitable measure). This improves upon the dictionary-based technique by adding texture to the images and the scalar factor increases the intensity of the newly added texture, thus making the details more distinct. In order to obtain the improved details from the image, the system may use a variable value of λ 710 to account for both uniform regions as well as texture regions. Consequently, this modification results in enhancing the texture and details of the image, as compared to the original degraded image.

Figure 8:
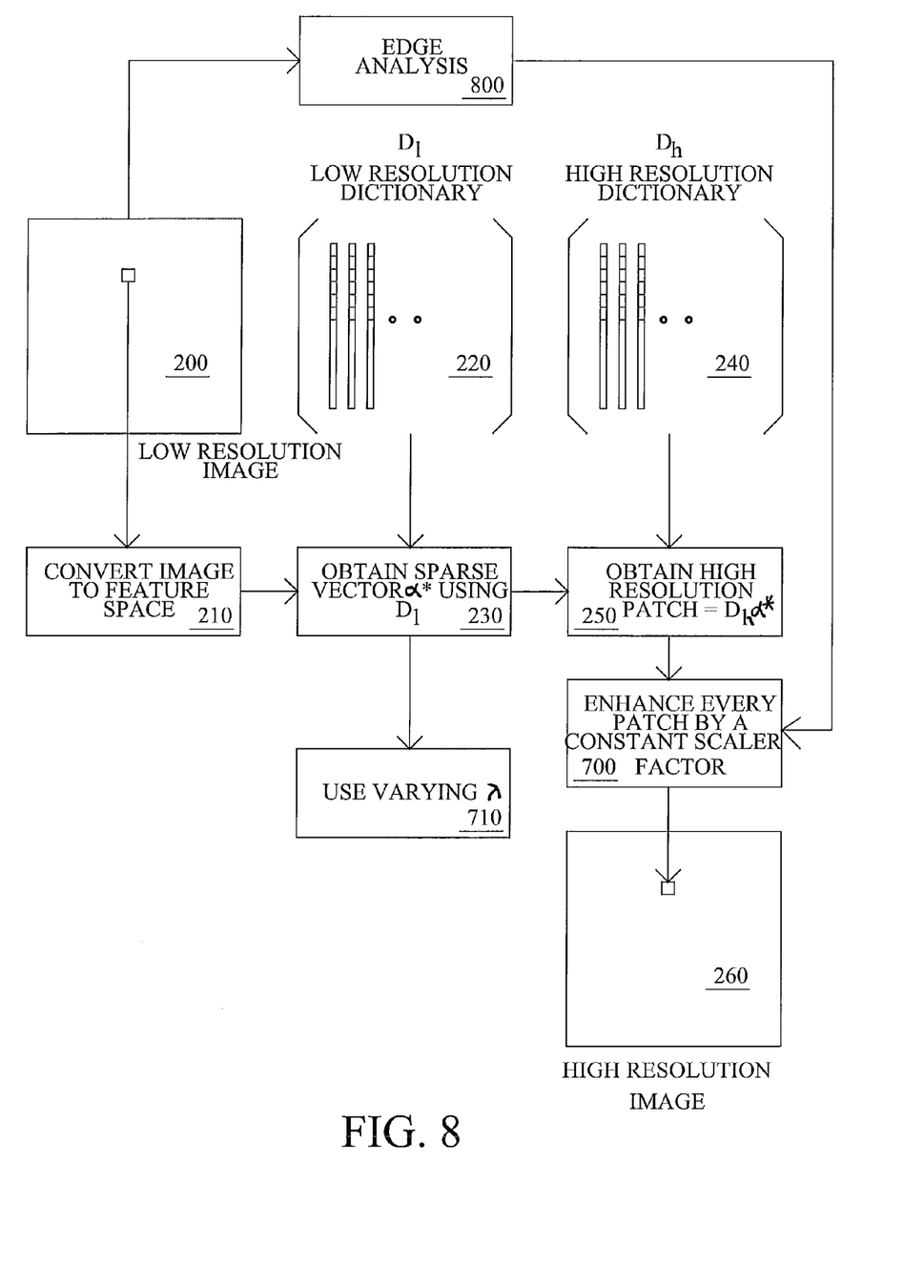
FIG. 8 illustrates a modified dictionary based framework for image processing.

Enhancing the texture of images using a constant scalar factor (or other suitable measure) results in boosting the desirable details of the image. However, along with enhancing the details of the image, this technique also tends to result in undesirable halo effects (undershoot and overshoot) along the edges of the images. In order to reduce these introduced halo effects, the system may make use of edge based information. It may be observed that the halo effects generally occur along strong edges of the image. In order to account for these halo effects, the image may be analyzed 800 using a suitable edge detector, such as using a Canny edge detector, in order to identify the edges of the image. Other analysis operators may be used to identify strong edges in the image. While considering patches from the image during reconstruction and enhancement, the system may also determine if the patches have sufficient edge information from the edge analysis stage. If insufficient edges are in the patch, the system enhances the intensity of the patch by a high value; else if edge information is present, then the system enhances the intensity by a lower value. This adaptively varying enhancement technique limits halo effects in the reconstructed and enhanced images.

Figure 9:
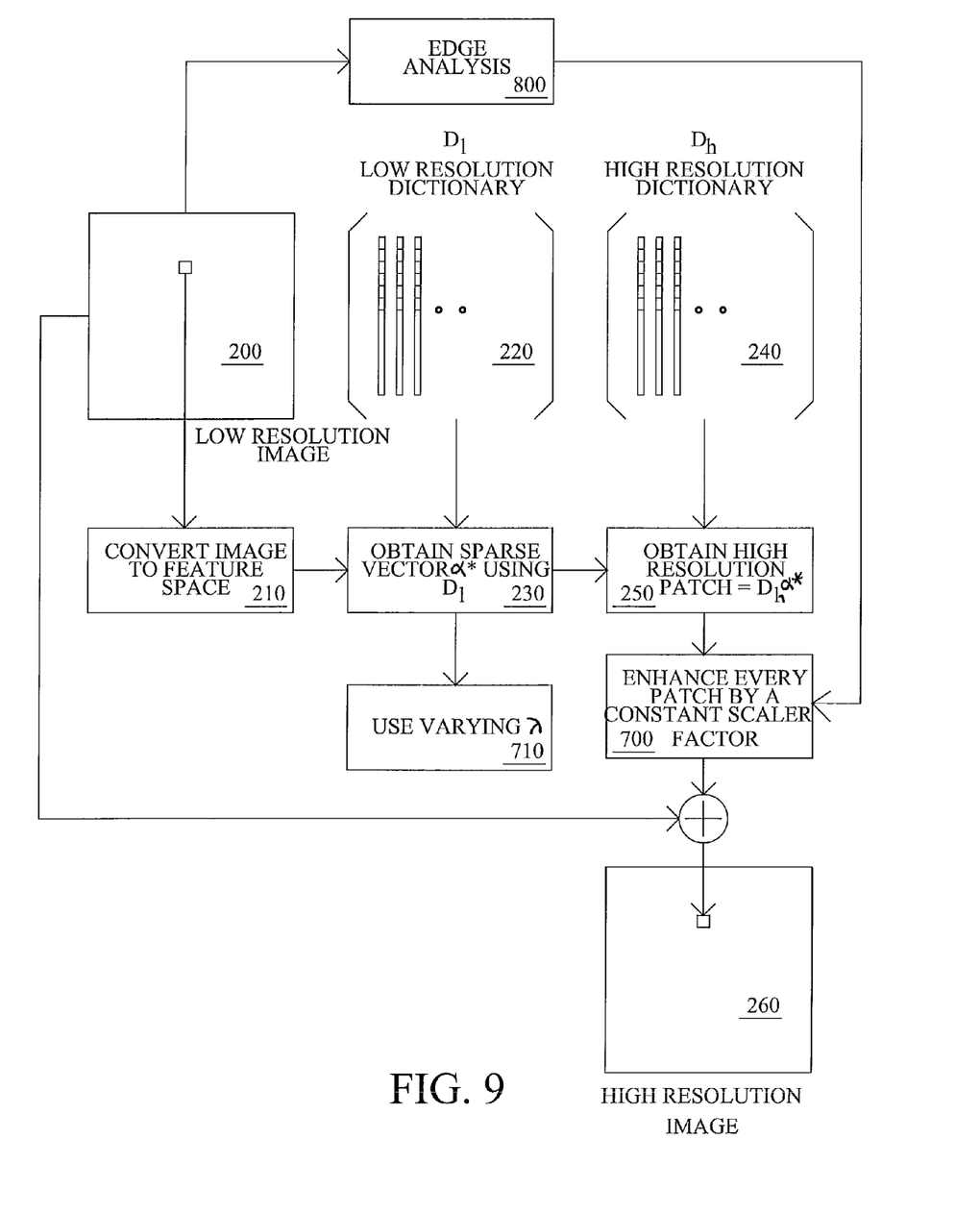
FIG. 9 illustrates a modified dictionary based framework for image processing.

Referring to FIG. 9, the segmentation 800 may be combined with the varying λ 710 to provide additional ability to suitably enhance texture.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for determining a high resolution image comprising:
   (a) receiving a low resolution image;
   (b) determining a vector for a patch of said low resolution image based upon a total number of non-zero dictionary elements of a low resolution dictionary that are used to said determine said vector, where said total number is modified using a parameter that balances the sparsity of a solution by adjusting the number of said elements used to determine said vector, said parameter inversely varied over said image relative to a standard deviation of a localized patch of said low resolution image;
   (c) determining a high resolution patch based upon a high resolution dictionary and said vector;
   (d) determining said high resolution image based upon said high resolution patch in a manner suitable to enhance the visual appearance of the high resolution image compared to said low resolution image and free from a constraint of reconstructing an original high resolution image corresponding to said low resolution image.

2. The method of claim 1 wherein said patch of said low resolution image for determining said vector is based upon a feature of said patch.

3. The method of claim 1 wherein said vector is a sparse vector containing a small number of non-zero weights.

4. The method of claim 1 wherein said low resolution dictionary and said high resolution dictionary are trained based upon a set of high resolution images.

5. The method of claim 1 wherein said determining said vector is based upon a variable factor dependent on the content of said low resolution image.

6. The method of claim 5 wherein said variable factor determines a number of non-zero weights in said vector.

7. The method of claim 2 wherein said feature includes at least one derivative of said low resolution image.

8. The method of 4 wherein said training is based upon a degradation operator.

9. The method of claim 8 wherein said degradation operator is a Gaussian blur.

10. The method of claim 8 wherein said degradation operator is introduction of compression artifacts.

11. The method of claim 8 wherein said degradation operator is loss of texture detail.

12. The method of claim 5 wherein said variable factor estimates localized texture content.

13. The method of claim 1 wherein said parameter is inversely varied in a stepwise manner over said image relative to a standard deviation of a localized patch of said low resolution image.

14. The method of claim 2 wherein said feature includes a Gabor filter.

15. The method of claim 2 wherein said feature includes a steerable complex pyramid.

16. The method of claim 2 wherein said feature includes a Sobel filter.

17. The method of claim 2 wherein said feature includes a Laplacian filter.

18. The method of claim 2 wherein said feature includes a 45 degree and 135 degree filter.

19. The method of claim 1 wherein said determining said high resolution patch is based upon a residue.

20. The method of claim 1 wherein said high resolution image is based upon degrading said low resolution image in a manner to determine dictionary based information.

21. The method of claim 1 wherein said high resolution patch is modified to selectively increase its intensity.

22. The method of claim 21 wherein said selectively increase is based upon image content.

* * * * *